US012433823B2

(12) United States Patent
Fu

(10) Patent No.: US 12,433,823 B2
(45) Date of Patent: Oct. 7, 2025

(54) MASSAGE ASSEMBLY, HUMAN BODY MASSAGE DEVICE, AND OPERATION METHOD THEREOF

(71) Applicant: Yidong Fu, Beijing (CN)

(72) Inventor: Yidong Fu, Beijing (CN)

( * ) Notice: Subject to any disclaimer, the term of this patent is extended or adjusted under 35 U.S.C. 154(b) by 1197 days.

(21) Appl. No.: 17/290,159

(22) PCT Filed: Mar. 5, 2019

(86) PCT No.: PCT/CN2019/076984
§ 371 (c)(1),
(2) Date: Apr. 29, 2021

(87) PCT Pub. No.: WO2020/087824
PCT Pub. Date: May 7, 2020

(65) Prior Publication Data

US 2022/0000712 A1 Jan. 6, 2022

(30) Foreign Application Priority Data

Oct. 29, 2018 (CN) ......................... 201821756728.7

(51) Int. Cl.
*A61H 39/04* (2006.01)

(52) U.S. Cl.
CPC ..... *A61H 39/04* (2013.01); *A61H 2201/0192* (2013.01); *A61H 2201/164* (2013.01);
(Continued)

(58) Field of Classification Search
CPC .. A61H 7/00–008; A61H 39/04; A61H 21/00; A61H 1/0222
See application file for complete search history.

(56) References Cited

U.S. PATENT DOCUMENTS 5,092,315 A * 3/1992 Bennett .................... A61H 1/00 601/93
5,328,443 A * 7/1994 Lee ...................... A61H 1/0237 74/53

(Continued)

FOREIGN PATENT DOCUMENTS

CN 1160995 A 10/1997
CN 202211163 U 5/2012

(Continued)

OTHER PUBLICATIONS

Written Decision on Registration mailed Feb. 2, 2024, directed to KR Patent Application No. 10-2021-7006591; 3 pages.

(Continued)

*Primary Examiner* — Joseph D. Boecker
*Assistant Examiner* — Thomas W Greig
(74) *Attorney, Agent, or Firm* — Michele V. Frank; Venable LLP; Keith G. Haddaway

(57) ABSTRACT

The present disclosure relates to a massage assembly, a human body massage device and an operation method thereof. The massage assembly includes: a first massage arm; a first massage head, rotatably connected to the first massage arm to massage acupoints and skin near an anus along with a motion of the first massage arm relative to a human body; and a rotation locking structure, arranged between the first massage arm and the first massage head to adjust, lock or unlock a rotation angle of the first massage head relative to the first massage arm. According to the present disclosure, the massage mode of the acupoints near the anus can be adjusted as required, and the massage effect can be improved.

22 Claims, 4 Drawing Sheets

(52) U.S. Cl.
CPC .................. *A61H 2201/165* (2013.01); *A61H 2201/1673* (2013.01); *A61H 2201/1676* (2013.01); *A61H 2201/1692* (2013.01); *A61H 2201/1695* (2013.01); *A61H 2205/083* (2013.01); *A61H 2205/086* (2013.01); *A61H 2205/108* (2013.01)

(56) References Cited

U.S. PATENT DOCUMENTS

| | | | | | |
|---|---|---|---|---|---|
| 5,415,621 | A * | 5/1995 | Campbell | A61H 7/004 | 601/87 |
| 5,904,660 | A * | 5/1999 | Kim | A61H 1/00 | 601/118 |
| 5,997,489 | A | 12/1999 | Iwamoto et al. | | |
| 6,436,029 | B1 * | 8/2002 | Benderev | A61H 19/34 | 128/885 |
| 6,599,261 | B1 * | 7/2003 | Chen | A61H 15/0078 | 601/134 |
| 7,338,417 | B2 * | 3/2008 | Kang | A61B 5/224 | 482/148 |
| 10,098,808 | B2 * | 10/2018 | Poole | A61H 1/00 | |
| 2004/0215116 | A1 * | 10/2004 | Kim | A61H 19/30 | 601/136 |
| 2006/0089576 | A1 * | 4/2006 | Yang | A61H 19/30 | 601/78 |
| 2017/0151126 | A1 * | 6/2017 | Kong | A61H 19/00 | |
| 2019/0282438 | A1 | 9/2019 | Fu | | |

FOREIGN PATENT DOCUMENTS

| | | | | |
|---|---|---|---|---|
| CN | 202270146 | U | 6/2012 | |
| CN | 207855923 | U | 9/2018 | |
| CN | 108618959 | A | 10/2018 | |
| CN | 108618960 | A | 10/2018 | |
| KR | 1997-0025581 | A | 6/1997 | |
| KR | 20-0408351 | Y1 | 2/2006 | |
| KR | 10-0889691 | B1 | 3/2009 | |
| KR | 10-0903912 | B1 | 6/2009 | |
| KR | 10-1462764 | B1 | 11/2014 | |
| WO | WO-03003968 | A1 * | 1/2003 | A61H 23/0254 |

OTHER PUBLICATIONS

International Search Report and Written Opinion mailed Jul. 8, 2019, directed to International Application No. PCT/CN2019/076984; 17 pages.

Extended European Search Report dated Mar. 30, 2022, directed to EP Application No. 19879451.3; 9 pages.

* cited by examiner

MASSAGE ASSEMBLY, HUMAN BODY MASSAGE DEVICE, AND OPERATION METHOD THEREOF

CROSS-REFERENCE TO RELATED APPLICATIONS

The application is a U.S. National Stage Application under 35 U.S.C. § 371 of International Patent Application No. PCT/CN2019/076984, filed on Mar. 5, 2019, which is based upon and claims priority to Chinese Patent Application No. 201821756728.7, filed on Oct. 29, 2018, the entire contents of both which are incorporated herein by reference.

FIELD OF THE INVENTION

The present disclosure relates to the field of human body massage, and in particular, to a massage assembly, a human body massage device and an operation method thereof.

BACKGROUND OF THE INVENTION

In China's urban population, irregular diet and living habits such as long-term drinking, intake of high-oil and high-irritant food, long-time sitting and standing, etc. are common, and these irregular habits may lead to an increase in the incidence rate of some urinary, reproductive part, anorectal and gastrointestinal diseases such as long-term constipation, anal fistula, haemorrhoids, prostatitis, impotence, spermatorrhea, prospermia, vaginitis, irregular menstruation, urethritis, etc. At present, the recovery of these diseases mainly depends on medication, surgical treatment and long-term recuperate.

Under the guidance of acupoint massage theory of traditional Chinese medicine, there are many acupoints, such as Huiyin acupoint, Qugu acupoint, Guanyuan acupoint, Changqiang acupoint, Qichong acupoint, Zhongzhu acupoint, Siman acupoint, Henggu acupoint and the like, densely distributed near the parts below the navel of human body, such as underbelly, perineum and anus. Massage stimulation of the specific acupoints and meridians may promote local blood circulation and improve metabolism, thereby assisting in treating the above diseases, relieving the symptoms, recovering body function and recuperating the body for a long time.

The inventor has proposed a wearable health-care massage device according to the current massage health-care needs. The health-care massage device can be mounted on the leg of the human body, and massage assembly mounting bracket perform pressing and friction massage on the acupoints of the human body or the skin and muscle near the acupoints by the massage assembly carried on the massaging assembly mounting bracket to promote local blood circulation, thus assisting in the disease recovery of users.

BRIEF SUMMARY OF THE INVENTION

Through continuous research of the inventor, it is found that the massage mode and the massage effect of the health-care massage device on the acupoints near the anus of the human body are relatively single, and there is room for further improvement.

In view of this, the embodiment of the present disclosure provides a massage assembly, a human body massage device and an operation method thereof, thereby adjusting the massage mode of the acupoints near the anus according to requirements and improving the massage effect.

In one aspect of the present disclosure, a massage assembly is provided. The massage assembly includes: a first massage arm; a first massage head, rotatably connected to the first massage arm to massage acupoints and skin near an anus along with a motion of the first massage arm relative to a human body; and a rotation locking structure, arranged between the first massage arm and the first massage head to adjust, lock or unlock a rotation angle of the first massage head relative to the first massage arm.

In some embodiments, the first massage head is configured to form a single bump pressing contact with the acupoints and skin near the anus; the first massage head is configured to realize pressing and friction massage of the acupoints and skin near the anus along with the motion of the first massage arm relative to the human body, when the rotation locking structure is in a locked state; and the first massage head is configured to swing relative to the acupoints and skin near the anus along with the motion of the first massage arm relative to the human body to realize rubbing massage of the acupoints and skin near the anus when the rotation locking structure is in an unlocked state.

In some embodiments, the first massage head is configured to form double bump pressing contact with a Huiyin acupoint and surrounding skin thereof as well as the acupoints and skin near the anus respectively along a front-rear direction of a midline of the human body; the first massage head is configured to realize pressing and friction massage of the Huiyin acupoint and surrounding skin thereof as well as the acupoints and skin near the anus along with the motion of the first massage arm relative to the human body when the rotation locking structure is in a locked state; and the first massage head is configured to adaptively adjust a massage angle according to shapes of the Huiyin acupoint and surrounding skin thereof as well as the acupoints and skin near the anus and along with the motion of the first massage arm relative to the human body when the rotation locking structure is in an unlocked state, so as to realize pressing and friction massage of the Huiyin acupoint and surrounding skin thereof as well as the acupoints and skin near the anus synchronously or alternately.

In some embodiments, the first massage head further includes a first attaching curved surface configured to attach to the acupoints and skin near the anus.

In some embodiments, the first massage head further includes: a first attaching curved surface configured to attach to the acupoints and skin near the anus; and a second attaching curved surface configured to attach to the acupoints and skin near the anus, the Huiyin acupoint and surrounding skin thereof, and/or skin inside a human thigh root.

In some embodiments, the first massage head includes: a massage head base, mounted on the first massage arm through the rotation locking structure; and a massage structure, arranged on the massage head base to massage human body parts at least including the acupoints and skin near the anus.

In some embodiments, the massage structure includes: a rotating disk, having contact structures in multiple forms of bumps and rotatably arranged on the massage head base, wherein the contact structures in the multiple forms of bumps are distributed at different rotation angles of the rotating disk.

In some embodiments, the rotation locking structure includes: a sleeve, movably sleeved on the first massage arm along a length direction of the first massage arm; a pivot shaft base, fixed outside the sleeve and connected to the massage head base through a pivot shaft; and a locking/ unlocking mechanism, arranged between the pivot shaft base and the massage head base to lock or unlock an angle of the massage head base relative to the pivot shaft base.

In some embodiments, the massage head base has a plurality of adjusting holes corresponding to different rotation angles; the locking/unlocking mechanism includes a button, a sliding key structure and an elastic component, an inner end of the button is inserted into one of the adjusting holes; the sliding key structure is arranged between the elastic component and the button, and a protruded structure of the sliding key structure is inserted into a side wall hole of the button under the action of the elastic component to lock motion of the button in an inserting direction of the adjusting holes.

In some embodiments, the first massage head further includes: a power driving mechanism, arranged between the massage head base and the pivot shaft base to drive the massage head base through power to swing in a midsagittal plane or a coronal plane of the human body relative to the first massage arm.

In some embodiments, the massage assembly further includes: a shaft disk mounting shell; a rotating shaft disk, fixedly connected to or made integrally with the first massage arm and rotatably arranged in the shaft disk mounting shell; and a torsional spring, arranged in the shaft disk mounting shell, wherein one end of the torsional spring is connected to the first massage arm or the rotating shaft disk, and another end of the torsional spring abuts against or is fixed to the shaft disk mounting shell.

In one aspect of the present disclosure, a human body massage device is provided. The human body massage device includes: the above-mentioned massage assembly; a massage assembly mounting bracket, configured to mount the massage assembly; and a leg clamping structure, mounted on the massage assembly mounting bracket and configured to be clamped and fixed to the leg of the human body.

In some embodiments, the leg clamping structure includes: a plurality of cross arms, connected to the massage assembly mounting bracket to apply extrusion forces to a front side and a rear side of a thigh of the human body simultaneously for clamping and fixing.

In some embodiments, a cushion block is arranged on the cross arm, the cushion block is adjustable relative to a length direction of the cross arm so as to be arranged between the cross beam and the leg of the human body.

In some embodiments, the massage assembly mounting bracket includes: a first bracket rod; a second bracket rod, sleeved on the first bracket rod and slidable relative to the first bracket rod to realize expansion and contraction; and a slide locking structure, arranged between the first bracket rod and the second bracket rod to lock or unlock slide of the second bracket rod relative to the first bracket rod.

In some embodiments, the massage assembly further includes: a shaft disk mounting shell, a rotating shaft disk and a torsional spring structure; the rotating shaft disk and the torsional spring structure are arranged in the rotating disk mounting shell, the rotating shaft disk is fixedly connected to the first massage arm, and forms an elastic rotating structure of the first massage arm relative to the shaft disk mounting shell by the torsional spring structure; and the massage assembly mounting bracket has a shaft disk fixing groove, and the shaft disk mounting shell is detachably mounted in the shaft disk fixing groove.

In some embodiments, the massage assembly mounting bracket has a torsion adjusting mechanism configured to adjust preload of the torsional spring structure.

In some embodiments, the massage assembly mounting bracket has a limiting clamping claw configured to limit and fix a rotation angle of the first massage arm relative to the massage assembly mounting bracket.

In some embodiments, the human body massage device further includes: a second massage arm, mounted on the massage assembly mounting bracket and located on a front side of the massage assembly along a length direction of the massage assembly mounting bracket; and a second massage head, mounted on the second massage arm to realize pressing and/or friction massage on acupoints of the underbelly of the human body.

In some embodiments, the human body massage device further includes at least one of the following: an angle adjusting mechanism, arranged between the second massage arm and the massage assembly mounting bracket to adjust an included angle of the second massage arm relative to the massage assembly mounting bracket; and a length adjusting mechanism, arranged between the second massage arm and the massage assembly mounting bracket to adjust an extension length of the second massage arm relative to the mounting position of the second massage arm on the massage assembly mounting bracket.

In some embodiments, the angle adjusting mechanism includes a ratchet and pawl mating structure configured to realize an adjustable unidirectional angle of the second massage arm in a direction towards the massage assembly.

In some embodiments, the human body massage device further includes: a waist belt, configured to be fastened to a waist of the human body; and a plurality of suspenders, each of which has one end connected to the waist belt and another end connected to the massage assembly mounting bracket and/or the leg clamping structure.

According to one aspect of the present disclosure, an operation method of the above-mentioned human body massage device is provided. The operation method of the human body massage device includes: clamping and fixing the leg clamping structure to the leg of the human body and enabling the first massage head in the massage assembly mounted on the massage assembly mounting bracket to abut against the acupoints and skin near the anus of the human body; adjusting and locking the rotation angle of the first massage head relative to the first massage arm by the rotation locking structure, or releasing locking of the rotation locking structure on the rotation angle of the first massage head relative to the first massage arm; and enabling the first massage head to massage the acupoints and skin near the anus of the human body through a preset repetitive action on the human body.

Therefore, according to the embodiment of the present disclosure, the rotation locking structure is arranged between the first massage arm and the first massage head, and the rotation angle of the first massage head relative to the first massage arm is adjusted, locked or unlocked, thereby realizing the massage modes and effects of the acupoints and skin near the anus based on different locking/unlocking states and improving the massage effect. A user may operate the rotation locking structure as required to adjust the massage mode, which is convenient to use.

BRIEF DESCRIPTION OF THE DRAWINGS

The accompanying drawings, which constitute a part of this description, describe the embodiments of the present disclosure, and together with the description, serve to explain the principles of the present disclosure.

Referring to the accompanying drawings and according to the following detained description, the present disclosure may be more clearly understood, wherein.

It should be understood that the dimensions of each part shown in the accompanying drawings are not drawn according to the actual proportional relationship. In addition, the same or similar reference numerals represent the same or similar components.

DETAILED DESCRIPTION OF THE INVENTION

Exemplary embodiments of the present disclosure are described in detail hereinafter with reference to the accompanying drawings. The description of the exemplary embodiments is merely illustrative and never constitutes any limitation to the present disclosure and application or use thereof. The present disclosure may be implemented in many different forms and is not limited to the embodiments described herein. The embodiments are provided to make the present disclosure thorough and complete and to fully express the scope of the present disclosure to those skilled in the art. It should be noted that unless otherwise specified, relative arrangement of parts and steps illustrated in the embodiments should be explained to be exemplary only, but not be construed as limitations.

The "first", "second" and other similar words do not denote any order, number or importance, but are merely intended to distinguish different parts. The "include" or "comprise" and other similar words mean that elements appearing before the word cover elements listed after the word, but do not exclude the possibility of covering other elements. "Up", "down", "left", "right", or the like is only used to indicate a relative location relationship. When an absolute location of a described object changes, the relative location relationship may also change accordingly.

In the present disclosure, when it is described that a specific device is positioned between a first device and a second device, an intermediate device may or may not be present between the specific device and the first device or the second device. When it is described that the specific device is connected to other device, the specific device may be directly connected to the other device and may not have the intermediate device, and may not be directly connected to the other device and may have the intermediate device.

All terms used in the present disclosure (including technical terms or scientific terms) have the same meaning as those understood by those of ordinary skill in the technical field which the present disclosure belongs to, unless otherwise specifically defined. It should be understood that terms defined in, for example, a general dictionary should be interpreted as having meanings consistent with the meanings in the context of the related art, and should not be interpreted in an idealized or extremely formal sense unless explicitly defined herein.

Technologies, methods and equipment known to those of ordinary skill in the related field may not be discussed in detail, but, where appropriate, the technologies, methods and equipment should be regarded as a part of the specification.

Figure 1:
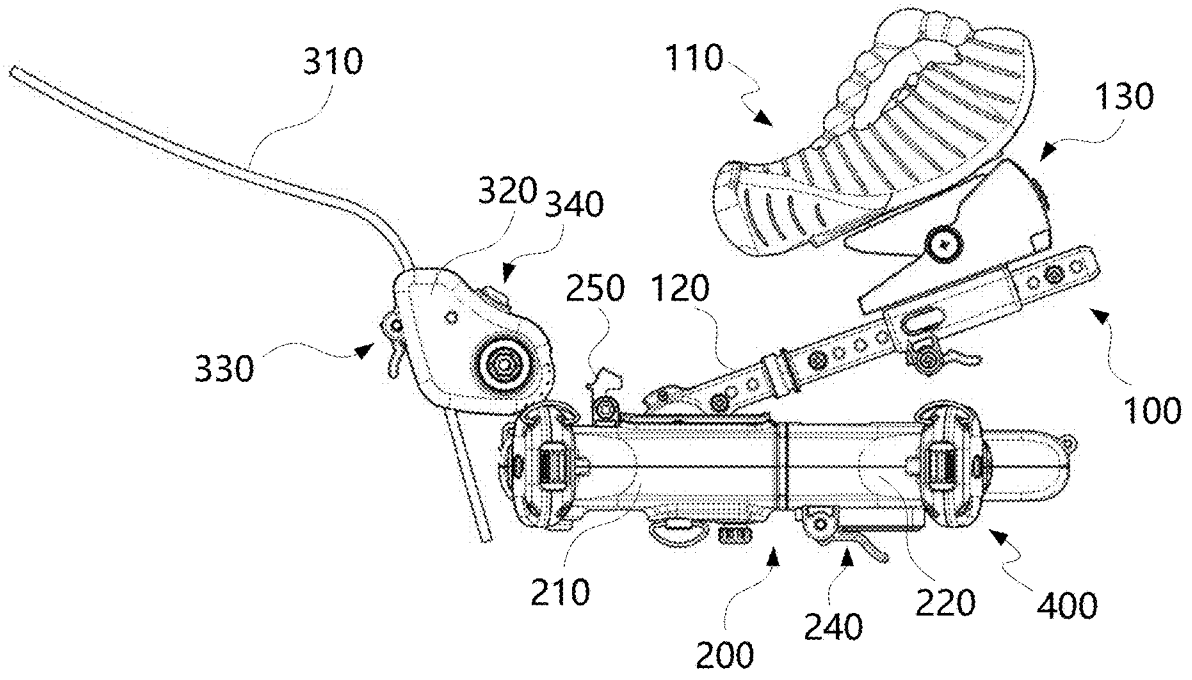
FIG. 1 is a schematic structural diagram of some embodiments of a human body massage device according to the present disclosure.

FIG. 1 is a schematic structural diagram of some embodiments of a human body massage device according to the present disclosure. In the embodiment, the human body massage device includes: a massage assembly 100, a massage assembly mounting bracket 200 and a leg clamping structure 400. The massage assembly mounting bracket 200 is configured to mount the massage assembly 100. The leg clamping structure 400 is mounted on the massage assembly mounting bracket 200 and configured to be clamped and fixed to the leg of the human body.

Referring to FIG. 1, in some embodiments, the massage assembly 100 includes: a first massage arm 120, a first massage head 110 and a rotation locking structure 130. The first massage arm 120 may be mounted on the massage assembly mounting bracket 200 and move relative to the human body along with the specific action of the human body or when being driven. The first massage head 110 is rotatably connected to the first massage arm 120 and may massage the acupoints and skin near the anus along with the motion of the first massage arm 120 relative to the human body.

The rotation locking structure 130 is arranged between the first massage arm 120 and the first massage head 110 for adjusting, locking or unlocking a rotation angle of the first massage head 110 relative to the first massage arm 120, so as to adjust a massage angle between the first massage head 110 and the acupoints and skin near the anus. When the first massage arm 120 and the first massage head 110 are locked by the rotation locking structure 130, the massage angle of the first massage head relative to the anus may be adjusted, and the first massage head 110 and the first massage arm 120 will move synchronously; and when the first massage arm 120 and the first massage head 110 are unlocked by the rotation locking structure 130, the first massage head 110 rotates relative to the first massage arm 120 while moving along with the first massage arm 120.

For different structures of the first massage head and in combination with the locked state or unlocked state of the first massage head relative to the first massage arm, different massage modes may be realized.

Figure 2:
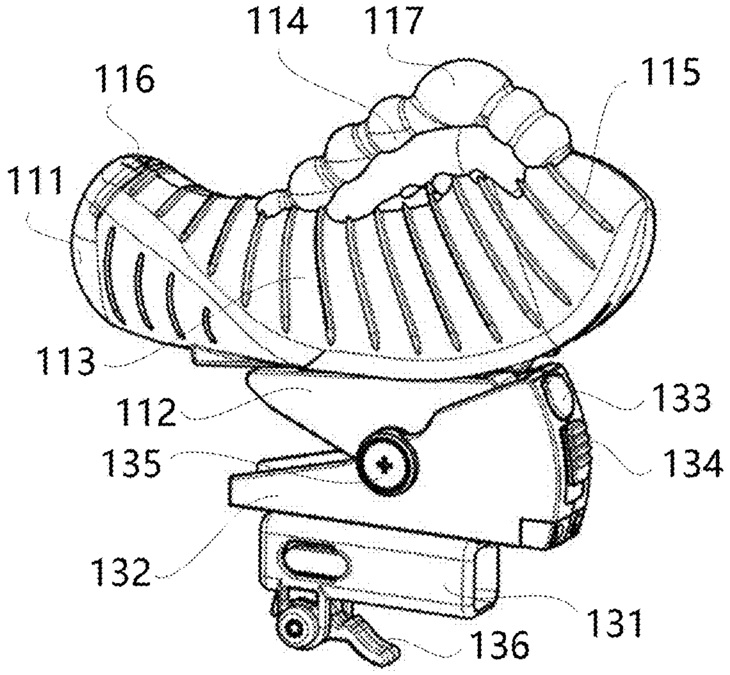
FIG. 2 is a schematic diagram of a mounting structure of a first massage head and a rotation locking structure in some embodiments of a massage assembly according to the present disclosure.
Figure 3:
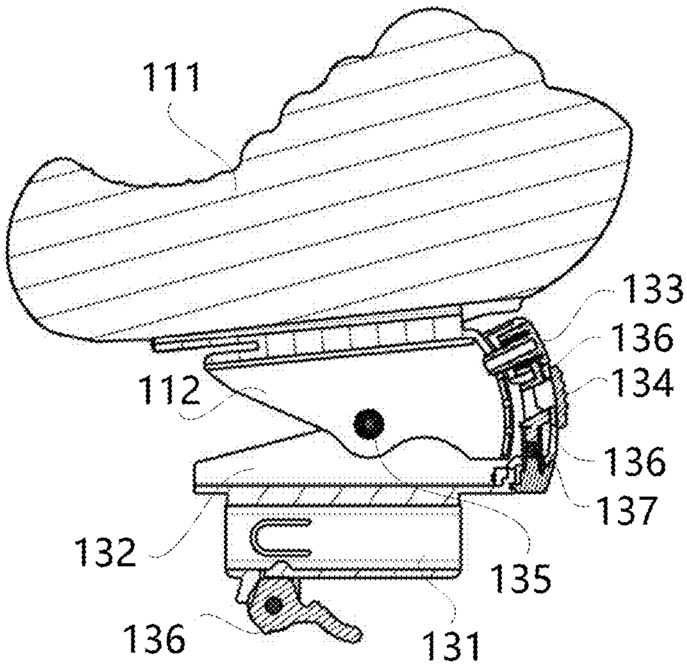
FIG. 3 is a schematic cross-section diagram of a first massage head and a rotation locking structure in some embodiments of a massage assembly according to the present disclosure.

Referring to FIG. 2 and FIG. 3, in some embodiments, the first massage head 110 is configured to form double bump pressing contact with a Huiyin acupoint and surrounding skin thereof as well as the acupoints and skin near the anus respectively along a front-rear direction of a midline of the human body. In FIG. 2, the first massage head includes a massage head base 112 and a massage structure 111. The massage head base 112 is mounted on the first massage arm 120 through the rotation locking structure 130. The massage structure 111 is arranged on the massage head base 112 for massaging human body parts at least including the acupoints and skin near the anus. For example, the massage structure 111 is further configured to massage a Huiyin acupoint and surrounding skin thereof.

The massage structure 111 has two bumps along a front-rear direction of a midline of the human body. One of the bumps is a front bump 116, and the front bump 116 may form bump pressing contact with the Huiyin acupoint and surrounding skin thereof. Another one of the bumps is a rear bump 117, and the rear bump 117 may form bump pressing contact with the acupoints and skin near the anus. In this way, the front bump 116 and the rear bump 117 achieve the effect of double bump pressing contact.

After the angle of the first massage head relative to the anus is adjusted to a comfortable position, if the rotation locking structure 130 is in a locked state, the first massage head 110 moves synchronously along with the motion of the first massage arm 120 relative to the human body. The front bump 116 of the first massage head 110 may conduct pressing massage on the Huiyin acupoint and surrounding skin thereof and may form friction massage on the Huiyin acupoint and surrounding skin thereof. The rear bump 117 may perform pressing massage and friction massage on the acupoints and skin near the anus.

When the rotation locking structure 130 is in an unlocked state, the first massage head 110 swings relative to the first massage arm 120 according to shapes of the Huiyin acupoint and surrounding skin thereof as well as the acupoints and skin near the anus along with the motion of the first massage arm 120 relative to the human body so as to adaptively adjusts the massage angle. The front bump 116 may realize pressing and friction massage of the Huiyin acupoint and surrounding skin thereof, and the rear bump 117 may realize pressing and friction massage on the acupoints and skin near the anus. With the swing of the first massage head 110, the front bump 116 and the rear bump 117 may perform pressing and friction massage synchronously or alternately, so as to achieve the massage effect of varying strength.

Based on the structure of the first massage head 110, the first massage head 110 further may include a first attaching curved surface 114 and a second attaching curved surface 113, wherein the first attaching curved surface 114 is configured to attach to the acupoints and skin near the anus, and the second attaching curved surface 113 is configured to attach to the acupoints and skin near the anus, the Huiyin acupoint and surrounding skin thereof and/or skin inside a human thigh root. In this way, when the first massage head 110 moves, the acupoints and skin near the anus, the Huiyin acupoint and surrounding skin thereof and/or the skin inside the human thigh root are performed friction massage at the same time through the first attaching curved surface 114 and the second attaching curved surface 113, thus achieving better massage effect.

A plurality of continuous spherical protrusions may be arranged on the first attaching curved surface 114 to form a three-dimensional corrugated curved surface structure. When the first attaching curved surface 114 performs pressing friction on the acupoints and skin near the anus, the changeable strength of the pressing friction on different parts may be achieved. A plurality of transverse strip-shaped protruded lines 115 may be arranged on the second attaching curved surface 113 and form a slight scraping massage effect when sliding on the acupoints and skin near the anus, the Huiyin acupoint and surrounding skin thereof and/or the skin inside the thigh root.

In some other embodiments, the first massage head 110 is further configured to form single bump pressing contact with the acupoints and skin near the anus. That is, only one bump (such as the rear bump 117) is arranged on the first massage head 110, and the bump forms single bump pressing contact with the acupoints and skin near the anus. When the rotation locking structure 130 is in a locked state, the first massage head 110 realizes pressing and friction massage of the acupoints and skin near the anus along with the motion of the first massage arm 120 relative to the human body. When the rotation locking structure 130 is in an unlocked state, the first massage head 110 swings relative to the acupoints and skin near the anus along with the motion of the first massage arm 120 relative to the human body so as to realize rubbing massage of the acupoints and skin near the anus.

The first massage head 110 with the structure further may include a first attaching curved surface 114. The first attaching curved surface 114 may be configured to attach to the acupoints and skin near the anus, thus achieving better massage effect with the motion of the first massage head 110 relative to the human body and through the friction massage on the acupoints and skin near the anus by the first attaching curved surface 114.

In some other embodiments, the massage structure 111 further may include a rotating disk. The rotating disk may be provided with contact structures in the multiple forms of bumps and may be rotatably arranged on the massage head base 112, and the contact structures in the multiple forms of bumps are distributed at different rotation angles of the rotating disk. In this way, a user may rotate the rotating disk as required to rotate a massage structure in the certain form of bumps to a position where the massage structure can be in contact with the skin, so that the user can achieve different massage effects.

Referring to FIG. 2, in some embodiments, the rotation locking structure 130 may specifically include: a sleeve 131, a pivot shaft base 132 and a locking/unlocking mechanism. The sleeve 131 movably sleeves the first massage arm 120 along a length direction of the first massage arm 120. A locking wrench 136 may be arranged on the sleeve 131. After the sleeve 131 is adjusted to a certain part of the first massage arm 120, the sleeve 131 may be locked on the first massage arm 120 by the locking wrench 136. The pivot shaft base 132 is fixed outside the sleeve 131 and is connected to the pressing head base 112 through a pivot shaft 135.

Referring to FIG. 3, the locking/unlocking mechanism may be arranged between the pivot shaft base 132 and the massage head base 112 and have a button or sliding key for manually locking/unlocking. In FIG. 3, the massage head base 112 is provided with a plurality of adjusting holes corresponding to different rotation angles. The locking/unlocking mechanism may include a button 133, a sliding key structure 134 and an elastic component 137, and an inner end of the button 133 may be inserted into any one of the adjusting holes. The sliding key structure 134 is arranged between the elastic component 137 and the button 133. Under the action of the elastic component, a protruded structure of the sliding key structure 134 is inserted into a side wall hole of the button 133 to lock the motion of the button 133 in an inserting direction of the adjusting hole.

When the user needs to release the restriction on the massage head base 112 by the button 133, the button 133 needs to be separated from the adjusting hole. In order to separate the button 133 from the adjusting hole, it is necessary to realize the restriction on the button 133 by the sliding key structure 134. Therefore, the user may operate the sliding key structure 134 to overcome an elastic force of the elastic component 137, so that the protruded structure of the sliding key structure 134 is separated from the side wall hole of the button 133. In this way, the button 133 is separated from the adjusting hole under the pulling action of the user or the action of another elastic structure.

In some embodiments, the massage head base 112 may swing relative to the first massage arm 120 along with the preset action of the human body. In some other embodiments, to improve the massage effect and save the physical strength of the user, the first massage head 110 further may include a power driving mechanism arranged between the massage head base 112 and the pivot shaft base 132. The power driving mechanism may drive the massage head base 112 through power to swing in a midsagittal plane and/or a coronal plane of the human body relative to the first massage arm 120. The power driving mechanism may include a motor or an air cylinder, etc.

Figure 4:
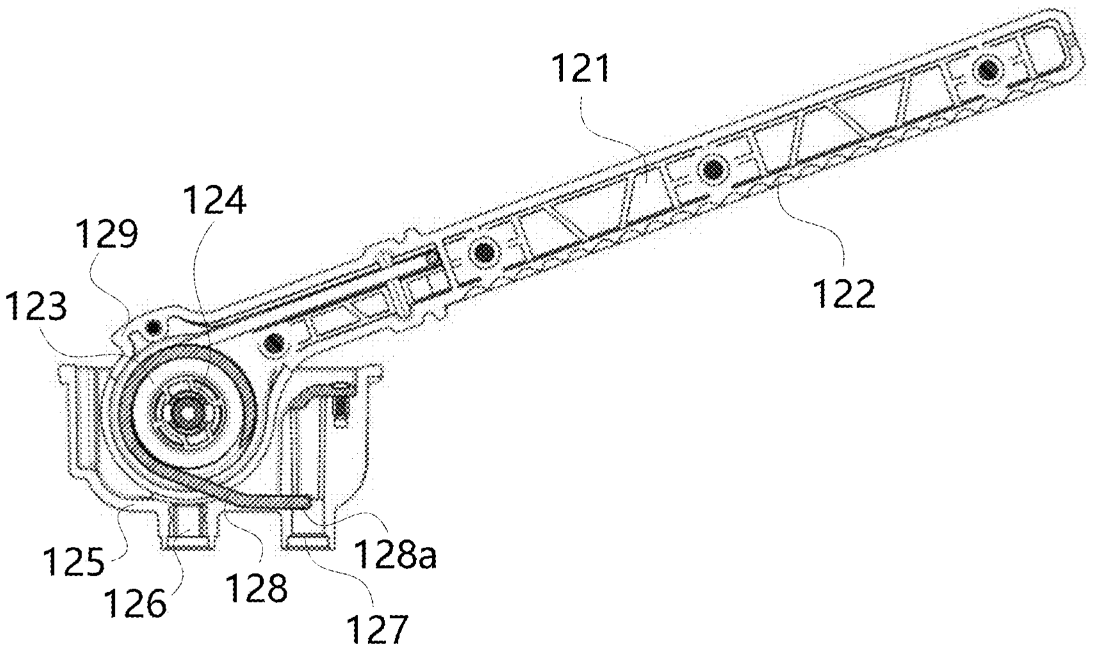
FIG. 4 is a schematic cross-section diagram of mounting structures such as a first massage arm, a rotating shaft disk and the like in some embodiments of a massage assembly according to the present disclosure.

Referring to FIG. 4, in some embodiments, the massage assembly 100 further may include: a shaft disk mounting shell 125, a rotating shaft disk 123 and a torsional spring structure 128. The rotating shaft disk 123 is fixedly connected to the first massage arm 120 and is rotatably arranged in the shaft disk mounting shell 125. A rotating shaft 124 of the rotating shaft disk 123 is arranged on the shaft disk mounting shell 125. In some other embodiments, the rotating shaft disk 123 may further be made integrally with the first massage arm 120.

The torsional spring structure 128 may be arranged in the shaft disk mounting shell 125. One end of the torsional spring structure 128 is connected to the first massage arm 120 or the rotating shaft disk 123, and another end 128*a* abuts against or is fixed to the shaft disk mounting shell 125, so that the first massage arm 120 and the rotating shaft disk 123 elastically swing relative to the shaft disk mounting shell 125.

Figure 5:
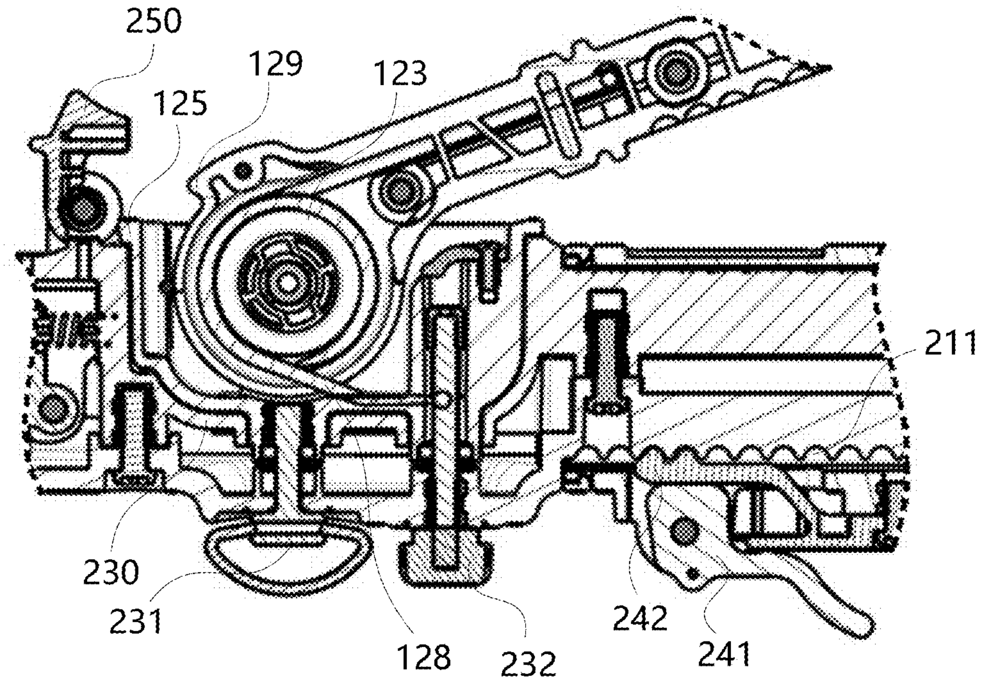
FIG. 5 is a schematic cross-section diagram of a mounting structure of a massage assembly on a massage assembly mounting bracket in some embodiments of a human body massage device according to the present disclosure.

Referring to FIG. 4 and FIG. 5, the shaft disk mounting shell 125 may be provided with a mounting hole 126 for being fixed to the massage assembly mounting bracket 200. The massage assembly mounting bracket 200 has a shaft disk fixing groove 230, and the shaft disk mounting shell 125 is detachably mounted in the shaft disk fixing groove 230 through a mounting piece 231. The mounting piece 231 may threadedly connect the mounting hole 126 in the shaft disk mounting shell 125 via its screw rod passing through the massage assembly mounting bracket 200. A rotating handle convenient to operate may be arranged on the mounting piece 231.

An adjusting hole 127 may be formed in the shaft disk mounting shell 125 and may cooperate with the torsion adjusting mechanism 232. The preload of the torsional spring structure 128 may be adjusted by adjusting the position of another end 128*a* of the torsional spring structure 128 by the torsion adjusting mechanism 232. The torsion adjusting mechanism 232 may drive another end 128*a* of the torsional spring structure 128 to change the position via the screw rod passing through the massage assembly mounting bracket 200 and moving in the adjusting hole 127.

In addition, referring to FIG. 5, the massage assembly mounting bracket 200 has a limiting clamping claw 250. The limiting clamping claw 250 is configured to limit and fix the rotation angle of the first massage arm 120 relative to the massage assembly mounting bracket 200, so as to maintain the first massage arm stable in the wearing process. A protrusion 129 which mates with the limiting clamping claw 250 is arranged on the first massage arm 120. The user may press the first massage arm 120 to a position close to the massage assembly mounting bracket 200 and clamp the protrusion 129 by the limiting clamping claw 250, thereby preventing the first massage arm 120 from interfering with the user wearing the body massage device.

Referring to FIG. 1 and FIG. 5, the massage assembly mounting bracket 200 includes: a first bracket rod 210, a second bracket rod 220 and a slide locking structure 240. The second bracket rod 220 may sleeve the first bracket rod 210 and may slide relative to the first bracket rod 210 to realize extension and retraction. The user may cause the second bracket rod 220 to extend or retract relative to the first bracket rod 210, so that the leg clamping structure 400 fits with the size of the user's leg.

The slide locking structure 240 is arranged between the first bracket rod 210 and the second bracket rod 220 for locking or unlocking sliding of the second bracket rod 220 relative to the first bracket rod 210. A plurality of adjusting teeth 211 may be arranged on the first bracket rod 210. The slide locking structure 240 includes an elastic protruded tooth 242 matched with the adjusting teeth 211 and an adjusting handle 241. The adjusting handle 241 may be in the form of a cam. The elastic protruded tooth 242 may be tightly embedded into a certain adjusting tooth 211 or be separated from the adjusting tooth 211 by changing a rotation angle of the adjusting handle 241, so that the position of the second bracket rod 220 relative to the first bracket rod 210 is adjusted, and adjustment of the clamping force and the comfortability of the leg clamping structure 400 on the leg is achieved.

Figure 6:
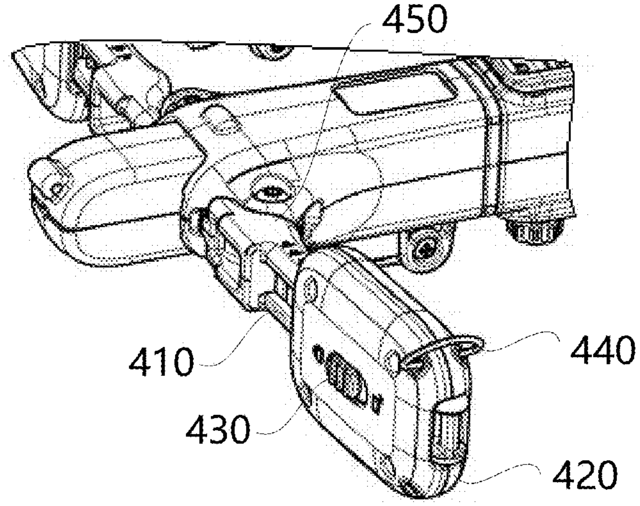
FIG. 6 is a schematic diagram of a mounting structure of a leg clamping structure in some embodiments of a human body massage device according to the present disclosure.

Referring to FIG. 6, in some embodiments, the leg clamping structure 400 includes: a plurality of cross arms 410. The plurality of cross arms 410 are connected to the massage assembly mounting bracket 200 for applying extrusion forces to the front side and the rear side of the thigh of the human body simultaneously for clamping and fixing. The cross arms 410 is configured to be foldable, for example, the cross arms 410 are connected to the massage assembly mounting bracket 200 through a rotating structure 450. In this way, the user may fold the cross arms 410 to a position close to the massage assembly mounting bracket 200 when not using the human body massage device, thus folding the human body massage device and reducing the occupied space. The front and rear rows of cross arms 410 may be folded towards each other and close to the massage assembly mounting bracket 200, so that the size after folding may be effectively reduced and storage is facilitated.

In FIG. 6, a cushion block 420 is arranged on the cross arm 410 and the position of the cushion block 420 is adjustable relative to a length direction of the cross arm 410. The cushion block 420 may have a larger contact surface than the cross arm 410 and is arranged between the cross arm 410 and the leg of the human body to enhance the comfortability when the leg clamping structure 400 clamps the leg. A locking piece 430 may be arranged on the cushion block 420 for locking and unlocking different positions of the cushion block 420 on the cross beam 410, so as to adjust according to the curve of the leg.

Figure 7:
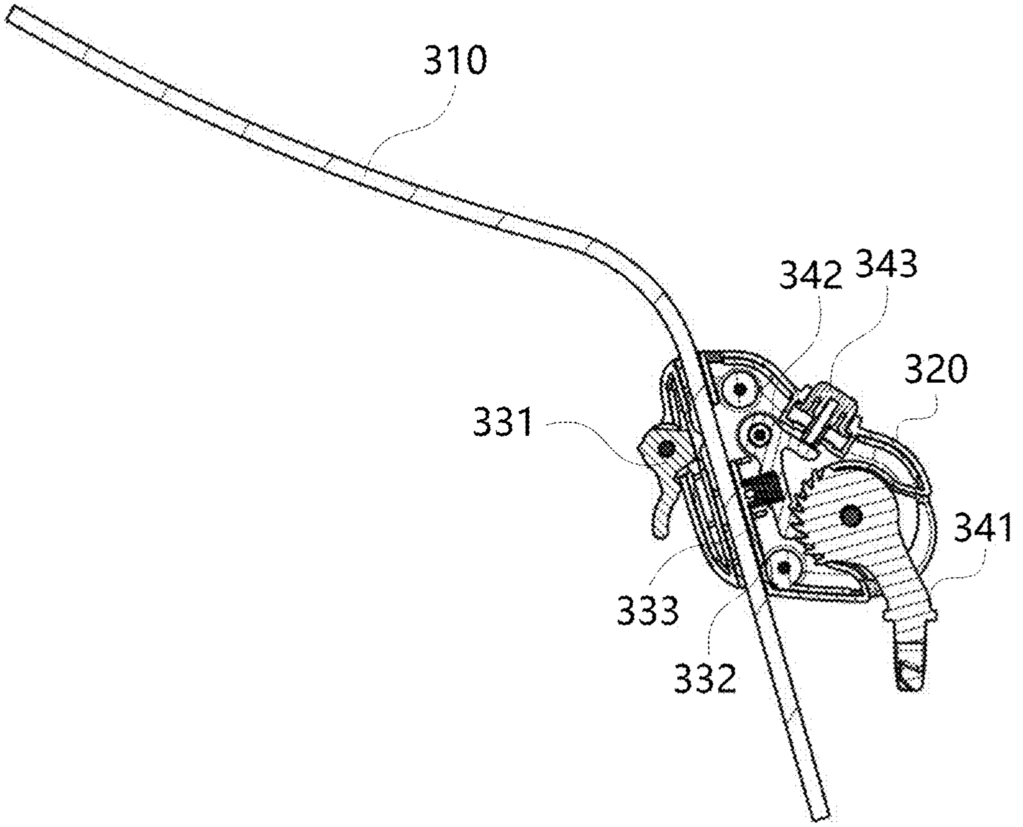
FIG. 7 is a schematic cross-section diagram of mounting structures of a second massage arm, a length adjusting mechanism, an angle adjusting mechanism and the like on a massage assembly mounting bracket in some embodiments of a human body massage device according to the present disclosure.

Referring to FIG. 1 and FIG. 7, in some embodiments, the human body massage device further may include: a second massage arm 310 and a second massage head (not shown in the figure). The second massage arm 310 is mounted on the massage assembly mounting bracket 200 and is located on a front side of the massage assembly 100 along a length direction of the massage assembly mounting bracket 200.

The second massage head is mounted on the second massage arm 310 and may be configured to perform pressing and/or friction massage on acupoints on the underbelly of the human body.

In order to facilitate the adjustment on the second massage arm by the user, the human body massage device may further include an angle adjusting mechanism 340. The angle adjusting mechanism 340 is arranged between the second massage arm 310 and the massage assembly mounting bracket 200 for adjusting an include angle of the second massage arm 310 relative to the massage assembly mounting bracket 200. The angle adjusting mechanism 340 includes a ratchet and pawl mating structure and can realize an adjustable unidirectional angle of the second massage arm 310 in a direction towards the massage assembly 100, so that an inclination angle of the second massage arm 310 relative to the human body can be changed to meet the usage requirements of the users.

For example, the angle adjusting mechanism 340 in FIG. 7 includes a ratchet piece 341, a pawl piece 342 and an angle adjusting button 343. The ratchet piece 341, the pawl piece 342 and the angle adjusting button 343 may be arranged in a shell 320. One end of the ratchet piece 341 is pivotally connected into the shell 320 and has a plurality of ratchet teeth, and another end of the ratchet piece 341 is detachably fixed on the massage assembly mounting bracket 200. The pawl piece 342 is unidirectionally matched with a plurality of ratchet teeth of the ratchet piece 341, so that the second massage arm 310 and the second massage head only can reduce their included angel towards one side (namely the rear direction of the human body) of the abdomen of the user and cannot enlarge their included angle reversely. One end of the angle adjusting button 343 is in contact with the pawl piece 342, and the pawl piece 342 may be driven to be separated from the ratchet piece 341 by operating the angle adjusting button 343, so that the second massage arm 310 can be adjusted in the front direction and rear direction of the human body relative to the massage assembly mounting bracket 200.

In order to facilitate the adjustment on the second massage arm by the user, the human body massage device may further include a length adjusting mechanism 330. The length adjusting mechanism 330 may be arranged between the second massage arm 310 and the massage assembly mounting bracket 200 for adjusting an extension length of the second massage arm 310 relative to the mounting position of the second massage arm 310 on the massage assembly mounting bracket 200.

For example, the length adjusting mechanism 330 in FIG. 7 includes a sleeve 332, a locking handle 331 and an elastic component 333. The sleeve 332 and the elastic component 333 may be arranged in the shell 320, and the elastic component 333 may abut against the sleeve 332 on one side of the sleeve 332. The second massage arm 310 penetrates into the sleeve 332, and one end of the locking handle 331 may pass through the sleeve 332 to abut against the second massage arm 310. When the user pulls the locking handle 331, the state that the locking handle 331 locks the second massage arm 310 may be released. In this way, the second massage arm 310 may move in the sleeve 332 to change the extension length of the second massage arm 310 relative to the mounting position of the second massage arm 310 on the massage assembly mounting bracket 200, thus meeting the usage requirements of the users.

For the users, the leg clamping structure 400 may fix the human body massage device at the leg. In order to further enhance the fixing effect and prevent the human body massage device from slipping off during use, the human body massage device further may include a waist belt and a plurality of suspenders. The waist belt may be fastened to the waist of the human body; and one end of each of the plurality of suspenders is connected to the waist belt and another end of each of the plurality of suspenders is connected to the massage assembly mounting bracket 200 and/or the leg clamping structure 400. For example, in FIG. 6, the cushion block 420 (or the cross arm 410) may be provided with a lifting ring 440 for connecting the suspender, and each of the cushion blocks 420 on four cross arms 410 is connected to one suspender, thus achieving a more stable suspending effect.

Figure 8:
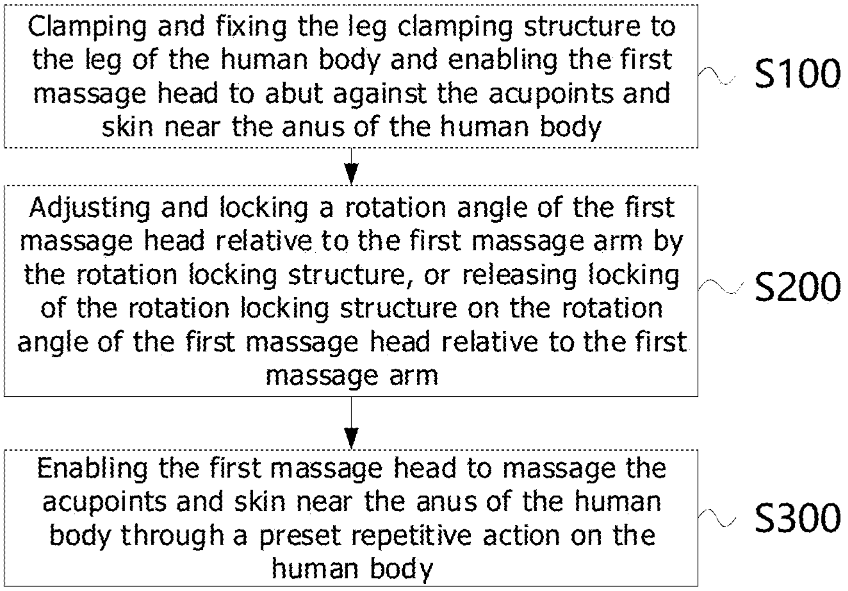
FIG. 8 is a schematic flow diagram of some embodiments of an operation method of a human body massage device according to the present disclosure.

Based on the above embodiments of respective human body massage devices, the present disclosure further provides a corresponding operation method. FIG. 8 is a schematic flow diagram of some embodiments of an operation method of a human body massage device according to the present disclosure. In FIG. 8, the operation method of the human body massage device includes:

Step S100: clamping and fixing the leg clamping structure 200 to the leg of the human body and enabling the first massage head 110 in the massage assembly 100 mounted on the massage assembly mounting bracket 200 to abut against the acupoints and skin near the anus of the human body;

Step S200: adjusting and locking the rotation angle of the first massage head 110 relative to the first massage arm 120 by the rotation locking structure 130, or releasing locking of the rotation locking structure 130 on the rotation angle of the first massage head 110 relative to the first massage arm 120; and Step S300: enabling the first massage head 110 to massage the acupoints and skin near the anus of the human body through a preset repetitive action on the human body.

In the embodiment, Step S200 may be performed before Step S100, that is, the user may adjust and lock the angle by the rotation locking structure 130, or release lock and then clamp the leg clamping structure 200 to the leg. In Step S300, the preset repetitive action is a repetitive flexion and extension action of the waist or knee of the human body in a standing state.

The user may change the first massage heads 110 with different structural forms in the massage assembly 100 as required and may realize different massage forms in combination with locking and unlocking of the rotation locking structure 130, for example, double bump pressing massage and friction massage on the Huiyin acupoint and surrounding skin thereof as well as the acupoints and skin near the anus, and for another example, synchronous or alternate double bump pressing and friction massage on the Huiyin acupoint and surrounding skin thereof as well as the acupoints and skin near the anus.

A plurality of embodiments in the specification are described in a progressive manner, the emphases of the embodiment are different, and the same or similar parts among the embodiments can be reference to each other. For the method embodiment, the whole and the related steps have a certain corresponding relationship with the content of the massage assembly and human body massage device embodiments, so the description is relatively simple, and the relevant points can be referenced to the partial descriptions of the assembly and device embodiments.

So far, embodiments of the present disclosure have been described in detail. To avoid obscuring the concepts of the present disclosure, some details known in the art are not described. Those skilled in the art may fully understand how to implement the technical solution disclosed herein according to the above description.

Although some specific embodiments of the present disclosure have been illustrated in detail through the examples, those skilled in the art should understand that the above examples are merely for illustration, but not intended to limit the scope of the present disclosure. Those skilled in the art should understand that the above embodiments may be modified or part of technical features may be equivalently replaced without departing from the scope and spirit of the present disclosure. The scope of the present disclosure is defined by the appended claims.

What is claimed is:

1. A massage assembly, comprising:

a first massage arm;

a first massage head, rotatably connected to the first massage arm, and configured to massage acupoints and skin near an anus along with a motion of the first massage arm relative to a human body; and a rotation lock, arranged between the first massage arm and the first massage head to adjust, lock or unlock a rotation angle of the first massage head relative to the first massage arm;

wherein the massage assembly further comprises:

a shaft disk mounting shell;

a rotating shaft disk, fixedly connected to or made integrally with the first massage arm and rotatably arranged in the shaft disk mounting shell; and a torsional spring, arranged in the shaft disk mounting shell, wherein one end of the torsional spring is connected to the first massage arm or the rotating shaft disk, and another end of the torsional spring abuts against or is fixed to the shaft disk mounting shell.

2. The massage assembly according to claim 1, wherein the first massage head is configured to form a single bump pressing contact with the acupoints and skin near the anus;

the first massage head is configured to realize pressing and friction massage of the acupoints and skin near the anus along with the motion of the first massage arm relative to the human body, when the rotation lock is in a locked state; and the first massage head is configured to swing relative to the acupoints and skin near the anus along with the motion of the first massage arm relative to the human body to realize rubbing massage of the acupoints and skin near the anus when the rotation lock is in an unlocked state.

3. The massage assembly according to claim 1, wherein the first massage head is configured to form double bump pressing contact with a Huiyin acupoint and surrounding skin thereof as well as the acupoints and skin near the anus respectively along a front-rear direction of a midline of the human body;

the first massage head is configured to realize pressing and friction massage of the Huiyin acupoint and surrounding skin thereof as well as the acupoints and skin near the anus along with the motion of the first massage arm relative to the human body when the rotation lock is in a locked state; and the first massage head is configured to adaptively adjust a massage angle according to shapes of the Huiyin acupoint and surrounding skin thereof as well as the acupoints and skin near the anus and along with the motion of the first massage arm relative to the human body when the rotation lock is in an unlocked state, so that the first massage head is configured to realize pressing and friction massage of the Huiyin acupoint and surrounding skin thereof as well as the acupoints and skin near the anus synchronously or alternately.

4. The massage assembly according to claim 2, wherein the first massage head further comprises a first attaching curved surface configured to attach to the acupoints and skin near the anus.

5. The massage assembly according to claim 3, wherein the first massage head further comprises:

a first attaching curved surface configured to attach to the acupoints and skin near the anus; and a second attaching curved surface configured to attach to the acupoints and skin near the anus, the Huiyin acupoint and surrounding skin thereof, and/or skin inside a human thigh root.

6. The massage assembly according to claim 1, wherein the first massage head comprises:

a massage head base, mounted on the first massage arm through the rotation lock; and a massage manipulator, arranged on the massage head base, and configured to massage human body parts at least comprising the acupoints and skin near the anus.

7. The massage assembly according to claim 6, wherein the massage manipulator comprises:

a rotating disk, having contact structures in multiple forms of bumps and rotatably arranged on the massage head base, wherein the contact structures in the multiple forms of bumps are distributed at different rotation angles of the rotating disk.

8. The massage assembly according to claim 6, wherein the rotation lock comprises:

a sleeve, movably sleeved on the first massage arm along a length direction of the first massage arm;

a pivot shaft base, fixed outside the sleeve and connected to the massage head base through a pivot shaft; and a locking/unlocking mechanism, arranged between the pivot shaft base and the massage head base to lock or unlock an angle of the massage head base relative to the pivot shaft base.

9. The massage assembly according to claim 8, wherein the massage head base has a plurality of adjusting holes corresponding to different rotation angles; the locking/unlocking mechanism comprises a button, a sliding key structure and an elastic component, an inner end of the button is inserted into one of the adjusting holes; the sliding key structure is arranged between the elastic component and the button, and a protruded structure of the sliding key structure is inserted into a side wall hole of the button under the action of the elastic component to lock motion of the button in an inserting direction of the adjusting holes.

10. The massage assembly according to claim 6, wherein the first massage head further comprises:

a power driving mechanism, arranged between the massage head base and the pivot shaft base to drive the massage head base through power to swing in a midsagittal plane or a coronal plane of the human body relative to the first massage arm.

11. A human body massage device, comprising:

the massage assembly according to claim 1;

a massage assembly mounting bracket, configured to mount the massage assembly; and a leg clamping fixture, mounted on the massage assembly mounting bracket and configured to be clamped and fixed to the leg of the human body.

12. The human body massage device according to claim 11, wherein the leg clamping fixture comprises:

a plurality of cross arms, connected to the massage assembly mounting bracket to apply extrusion forces to a front side and a rear side of a thigh of the human body simultaneously for clamping and fixing.

13. The human body massage device according to claim 12, wherein a cushion block is arranged on the cross arm, the cushion block is adjustable relative to a length direction of the cross arm so as to be arranged between the cross beam and the leg of the human body.

14. The human body massage device according to claim 11, wherein the massage assembly mounting bracket comprises:

a first bracket rod;

a second bracket rod, sleeved on the first bracket rod and slidable relative to the first bracket rod to realize expansion and contraction; and a slide locking structure, arranged between the first bracket rod and the second bracket rod to lock or unlock slide of the second bracket rod relative to the first bracket rod.

15. The human body massage device according to claim 11, wherein the rotating shaft disk forms an elastic rotating structure of the first massage arm relative to the shaft disk mounting shell by the torsional spring structure; and the massage assembly mounting bracket has a shaft disk fixing groove, and the shaft disk mounting shell is detachably mounted in the shaft disk fixing groove.

16. The human body massage device according to claim 15, wherein the massage assembly mounting bracket has a torsion adjusting mechanism configured to adjust preload of the torsional spring structure.

17. The human body massage device according to claim 11, wherein the massage assembly mounting bracket has a limiting clamping claw configured to limit and fix a rotation angle of the first massage arm relative to the massage assembly mounting bracket.

18. The human body massage device according to claim 11, further comprising:

a second massage arm, mounted on the massage assembly mounting bracket and located on a front side of the massage assembly along a length direction of the massage assembly mounting bracket; and a second massage head, mounted on the second massage arm to realize pressing and/or friction massage on acupoints of the underbelly of the human body.

19. The human body massage device according to claim 18, further comprising at least one of the following:

an angle adjusting mechanism, arranged between the second massage arm and the massage assembly mounting bracket to adjust an included angle of the second massage arm relative to the massage assembly mounting bracket; and a length adjusting mechanism, arranged between the second massage arm and the massage assembly mounting bracket to adjust an extension length of the second massage arm relative to the mounting position of the second massage arm on the massage assembly mounting bracket.

20. The human body massage device according to claim 19, wherein the angle adjusting mechanism comprises a ratchet and pawl mating structure configured to realize an adjustable unidirectional angle of the second massage arm in a direction towards the massage assembly.

21. The human body massage device according to claim 11, further comprising:

a waist belt, configured to be fastened to a waist of the human body; and a plurality of suspenders, each of which has one end connected to the waist belt and another end connected to the massage assembly mounting bracket and/or the leg clamping fixture.

22. An operation method of the human body massage device according to claim 11, comprising:

clamping and fixing the leg clamping fixture to the leg of the human body and enabling the first massage head in the massage assembly mounted on the massage assembly mounting bracket to abut against the acupoints and skin near the anus of the human body;

adjusting and locking the rotation angle of the first massage head relative to the first massage arm by the rotation lock, or releasing locking of the rotation lock on the rotation angle of the first massage head relative to the first massage arm; and enabling the first massage head to be configured to massage the acupoints and skin near the anus of the human body through a preset repetitive action on the human body.

* * * * *